(12) United States Patent  
Hall et al.

(10) Patent No.: US 10,124,711 B1  
(45) Date of Patent: Nov. 13, 2018

(54) AUTOMATED FLORA OR FAUNA RETRIEVER

(71) Applicants: David R. Hall, Provo, UT (US); Mark Hall, Springville, UT (US); Joe Fox, Spanish Fork, UT (US)

(72) Inventors: David R. Hall, Provo, UT (US); Mark Hall, Springville, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/592,612

(22) Filed: May 11, 2017

(51) Int. Cl.
*B60P 3/04* (2006.01)
*G05D 1/00* (2006.01)
*G07C 5/00* (2006.01)
*G06Q 10/08* (2012.01)

(52) U.S. Cl.
CPC .............. *B60P 3/04* (2013.01); *G05D 1/0055* (2013.01); *G05D 1/0088* (2013.01); *G06Q 10/0832* (2013.01); *G07C 5/008* (2013.01); *G05D 2201/0212* (2013.01)

(58) Field of Classification Search
None
See application file for complete search history.

(56) References Cited

U.S. PATENT DOCUMENTS

| | | | | |
|---|---|---|---|---|
| 2010/0063651 A1* | 3/2010 | Anderson | ............ | G05D 1/0088 701/2 |
| 2010/0063954 A1* | 3/2010 | Anderson | ............ | G05D 1/0221 706/50 |
| 2010/0094499 A1* | 4/2010 | Anderson | ............ | G05D 1/0295 701/23 |
| 2012/0101679 A1* | 4/2012 | Anderson | ............. | B25J 9/1671 701/23 |

* cited by examiner

*Primary Examiner* — Richard M Camby (57) ABSTRACT

A flora or fauna retrieval apparatus, comprising a frame mechanically connected to a transportation module to move the apparatus. The apparatus may comprise a location identification module, a number of flora or fauna attribute sensors communicatively connected to a communication module, and a flora or fauna storage container. The communication module may be configured to communicate with a computing device to exchange information about the animals or plants to be retrieved, and obtain information about optimal conditions for animals or plants scheduled for delivery. The flora or fauna storage container may comprise a temperature regulator, an aperture to let in air, and a humidity controller. The aperture may be adjustable. The temperature regulator, aperture, and humidity controller may use the information about optimal conditions for animals or plants scheduled to be delivered, to adjust the conditions of the flora or fauna storage container to remain within the optimal conditions for animals or plants scheduled to be delivered.

20 Claims, 8 Drawing Sheets

AUTOMATED FLORA OR FAUNA RETRIEVER

FIELD OF THE INVENTION

The disclosed embodiments relate to methods and systems for receiving organisms, which may be either living or dead, from a delivery agent.

BACKGROUND OF THE INVENTION

The "last mile" of communications from a retailer to a home can be improved and streamlined significantly. Often, the homeowners are not home to accept a delivery and the package is left on the doorstep, subject to theft and the weather. Animals or plants that may be delivered require specific conditions and attention.

Modern methods and systems for receiving a shipment, including living or dead organisms such as bacteria, fungus, plants, and animals, are being developed with increased functionality over methods and systems of the past. However, automated receiving and storing of animals or plants at preferable, comfortable settings for the animals or plants do not exist today. The disclosure addresses the issues of automated receiving and storage of organisms which may be dead or living.

SUMMARY

A flora or fauna retrieval apparatus is disclosed; the apparatus may have a frame and a transportation module which is moving the apparatus to and from a location; the apparatus may have a location identification module, such as a global positioning system module, for identifying the location of the apparatus; the apparatus may have a sensor system (1010) which may include a number of systems for transportation or may have a number of flora or fauna attribute sensors mechanically connected to the frame, the flora or fauna attribute sensors measuring attributes of a number of animals or plants to be retrieved; examples of attribute sensors include a weighing scale (1035), an infrared scanner (1036), a temperature scanner (1037) for measuring the temperature of an object, a humidity sensor (1039) for determining the humidity of a storage container containing an amount of flora or fauna (and for which the humidity reading may be associated with a flora or fauna humidity reading), and a camera (1040) for viewing the organism. Sensors may be coupled to the processor; examples of sensors include a proximity sensor (1041) and a motion sensor (1042).

A flora or fauna retrieval apparatus (100) is disclosed, the apparatus comprising: a movement system (1030) comprising an engine or motor (1031), a movement system power source (1032), a transmission (1033) comprising at least one of a gearbox, clutch, different, and, at least one wheel (1034), a frame (102) operably coupled to the at least one wheel; a transportation module (1050) communicatively-coupled to the movement system, the transportation module instructing the movement system to transport the flora or fauna retrieval apparatus between a first location and a second location; a location identification module (1051) coupled to the frame, the location identification module identifying the location of the flora or fauna retrieval apparatus; a number of flora or fauna attribute sensors (1052) coupled to the frame, the flora or fauna attribute sensors measuring an attribute of a number of animals or plants having a total volume less than 100 quarts and having been retrieved by the flora or fauna retrieval apparatus; a communication module (1053) communicatively-coupled to the number of flora or fauna attributes sensors, the communication module comprising programmable code stored on a non-transitory storage unit wherein the programmable code comprises instructions for 1) communicating an authentication token to an authentication module operating 1) communicating with an enclosure actuator module opening and closing an enclosure barrier actuator and 2) communicating with a computing device to a) receive information about the animals or plants to be retrieved; b) obtain information about the optimal conditions for animals or plants scheduled to be delivered to the flora or fauna storage container; and, a flora or fauna storage container mechanically connected to the frame to contain received animals or plants, the flora or fauna storage container comprising a temperature regulator, an adjustable aperture device defining an aperture, the adjustable aperture device allowing an in-flow volume of air, and a humidity controller.

Figure 2:
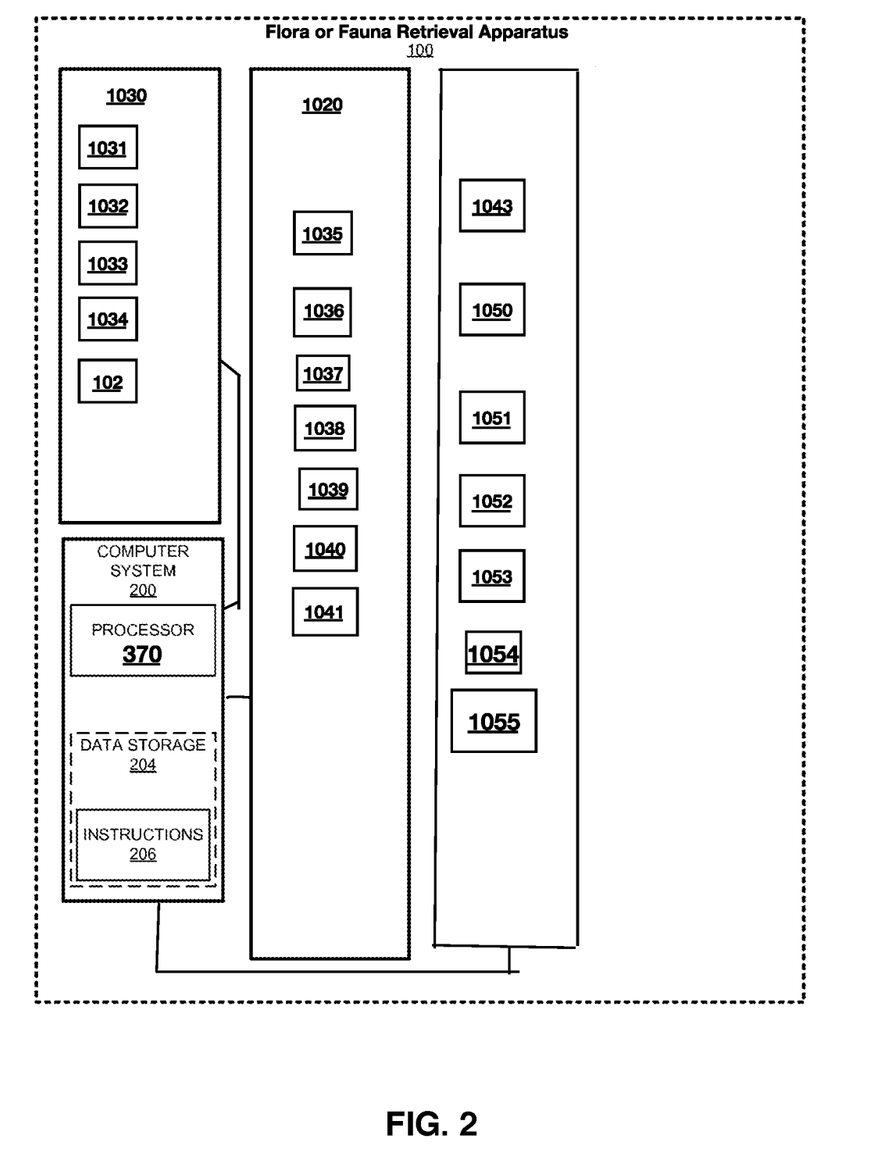
FIG. 2 illustrates a computing device for a flora or fauna retrieval apparatus.

The computer system (200) may be communicatively-coupled to each or some of the elements depicted on FIG. 2, such as the modules or sensors.

The apparatus may have a communication module communicatively connected to the number of flora or fauna attributes sensors, the communication module comprising programmable code stored on a non-transitory storage unit wherein the programmable code comprises instructions for 1) communicating with an enclosure barrier actuating mechanism a set of commands for opening and closing an enclosure barrier and 2) communicating with a computing device to a) exchange information about the animals or plants to be retrieved and to b) obtain information about the optimal conditions for animals or plants scheduled to be delivered to the flora or fauna storage container.

The apparatus may have a flora or fauna storage container mechanically connected to the frame to contain a received organism, the flora or fauna storage container comprising a temperature regulator, an adjustable aperture to let in air, and a humidity controller.

In yet another embodiment, the flora or fauna retrieval apparatus may have a transportation module for actuating the flora or fauna retrieval apparatus to move at least 3 feet using at least one of roll, fly, or crawl.

The flora or fauna retrieval apparatus may further comprise a radio frequency broadcast identification system, the radio frequency broadcast identification system may be configured to identify the flora or fauna retrieval apparatus to external systems.

The flora or fauna retrieval apparatus may further comprise a number of user identifiers, to identify a party from whom the animals or plants are being retrieved.

The flora or fauna retrieval apparatus may include a number of user identifiers, including at least one of a biometric reader, a facial recognition module, and an identification reader.

The flora or fauna attribute sensors may include at least one of a camera, a weight scale, a heartbeat monitor, an oxygen sensor, a motion sensor, a humidity sensor, a soil moisture sensor, and a radio frequency identification reader.

In yet another embodiment, the adjustable aperture of the apparatus may be adjusted in size to let in air according to the information about optimal conditions for animals or plants to be retrieved. In yet another embodiment, the non-transitory storage medium additionally comprises emergency contact information.

In yet another embodiment, the flora or fauna retrieval apparatus may have a communication module notifiying an emergency contact that the animals require immediate attention when the flora or fauna attribute sensors detect that the attributes of the animals or plants are outside the allowed range according to the information about animals or plants scheduled to be delivered to the flora or fauna storage container.

In yet another embodiment, the flora or fauna retrieval apparatus may have a temperature regulator adjusting the temperature of the flora or fauna receptacle according to the information about the optimal conditions for animals or plants scheduled to be delivered to the flora or fauna storage container.

In yet another embodiment, the flora or fauna retrieval apparatus may have a humidity controller coupled to a humidity sensor and adjusting the humidity of the flora or fauna receptacle according to the information about the optimal conditions for animals or plants scheduled to be delivered to the flora or fauna storage container. The apparatus may include a sprayer coupled to a water holder holding water; the sprayer may be coupled to a spray actuator; the spray actuator may be communicatively coupled to a humidity control module with data stored on a non-transitory storage medium; the humidity controller receiving data inputs of optimal conditions for a received plant or animal. The humidity controller may receive data input from a humidity sensor located inside of the flora or fauna storage container (114), may then compare the measured humidity to stored data of an optimal range of humidity for a certain received flora or fauna, and may then instruct the spray actuator to actuate the sprayer so that the sprayer sprays water into the flora or fauna storage container (114); the humidity control module may then use a feedback loop of instructing the humidity sensor to measure the level of humidity, instructing the sprayer actuator to actuate and spray water, and so forth until the humidity level inside the flora or fauna storage container has reached an optimal level or is within a range of optimal humidity values.

In yet another embodiment, the flora or fauna retrieval apparatus may have a camera, such as a video camera, infrared camera or other camera.

In yet another embodiment, the flora or fauna retrieval apparatus may further comprise an optical flora or fauna recognition module of the received number of animals or plants.

In one disclosed method for retrieving animals or plants, the following steps are included: providing a flora or fauna retrieval apparatus for retrieving animals or plants; storing the flora or fauna retrieval apparatus in an enclosure with a number of barriers; receiving information to the flora or fauna retrieval apparatus, via a communication module, about the optimal conditions for animals or plants scheduled to be delivered; adjusting, via a temperature regulator, the temperature of a flora or fauna receptacle on the flora or fauna retrieval apparatus, according to the information about optimal conditions for animals or plants scheduled to be delivered; receiving a notification to the flora or fauna retrieval apparatus, via the communication module, that a delivery agent is within a distance range of the location of the apparatus; sending a signal from the flora or fauna retrieval apparatus to an enclosure barrier opening mechanism, via the communication module, to actuate one of the number of barriers to an open position; moving the flora or fauna retrieval apparatus, via a transportation module, through the barrier that has been actuated to an open position, and out of the enclosure to the delivery agent; opening a cover on the flora or fauna receptacle of the flora or fauna retrieval apparatus, via an automated track; receiving a flora or fauna into the flora or fauna storage container from the delivery agent; closing the cover on the flora or fauna storage container of the flora or fauna retrieval apparatus, via the automated track; moving the flora or fauna retrieval apparatus, via the transportation module, back into the enclosure; sending a second signal from the flora or fauna retrieval apparatus to the enclosure barrier opening mechanism, via the communication module, to close the barrier that has been actuated to an open position.

In yet another embodiment of the method for retrieving animals or plants, the flora or fauna retrieval apparatus, the distance range may be between 0.0001 miles and 2 miles; in other embodiments the distance range may be between 1mile and 4 miles; in other embodiments the distance range is between 4 miles and 10 miles; in other methods, the distance range may be between 10 miles and 20 miles; in other embodiments of the method, the distance range may be between 2 miles and 3 miles; in other embodiments of the method, the distance range may be between 1.5 miles and 2.5 miles; in other embodiments of the method, the distance range may be between 3 miles and 3.5 miles.

In yet another embodiment of the method, the flora or fauna retrieval apparatus additionally comprises: adjusting an adjustable aperture on the flora or fauna receptacle to let in air according to the information about optimal conditions for animals or plants scheduled to be delivered to the flora or fauna storage container.

In yet another method, the flora or fauna retrieval apparatus additionally comprises: providing a number of flora or fauna attribute sensors mechanically connected to the flora or fauna receptacle and communicatively connected to the communication module; and, measuring, via the flora or fauna attribute sensors, attributes of a number of animals or plants to be retrieved.

In yet another embodiment, the flora or fauna retrieval apparatus additionally performs the method which comprises: obtaining, via the communication module, information about the animals or plants to be retrieved; notifying, via the communication module, an emergency contact that the animals require immediate attention, when the flora or fauna attribute sensors detect that the attributes of the animals or plants are outside the allowed range according to the information about the animals or plants scheduled to be retrieved.

In yet another the flora or fauna retrieval apparatus additionally comprises: a frame;

a transportation module mechanically connected to the frame, the transportation module moving the flora or fauna retrieval apparatus between locations;

a location identification module mechanically connected to the frame, the location identification module identifying the location of the flora or fauna retrieval apparatus;

a number of flora or fauna attribute sensors mechanically connected to the frame, the flora or fauna attribute sensors measuring attributes of a number of animals or plants to be retrieved;

a communication module communicatively connected to the number of flora or fauna attributes sensors, the communication module communicating with a computing device to a) exchange information about the animals or plants to be retrieved; b) obtain information about the optimal conditions for animals or plants scheduled to be delivered to the flora or fauna storage container, a flora or fauna storage container mechanically connected to the frame to contain a received organism, the flora or fauna storage container comprising a temperature regulator, an adjustable aperture to let in air, and a humidity controller;

the adjustable aperture configured to adjust to let in air according to the information about optimal conditions for animals or plants to be retrieved;

the temperature regulator configured to adjust the temperature of the flora or fauna receptacle according to the information about the optimal conditions for animals or plants scheduled to be delivered to the flora or fauna storage container;

the humidity controller configured to adjust the humidity of the flora or fauna receptacle according to the information about the optimal conditions for animals or plants scheduled to be delivered to the flora or fauna storage container;

the communication module configured to notify an emergency contact that the animals or plants require immediate attention, when the flora or fauna attribute sensors detect that the attributes of the animals or plants are outside the allowed range according to the information about the animals or plants scheduled to be retrieved;

a radio frequency broadcast identification system, the radio frequency broadcast identification system identifying the flora or fauna retrieval apparatus to external systems; and a number of user identifiers, to identify a party from whom the animals or plants are being retrieved.

In yet another embodiment, the flora or fauna retrieval apparatus sends a temporary user identifier to the emergency contact and allow the person with the temporary user identifier access to the flora or fauna storage container.

A more particular description of embodiments of the invention briefly described above is made below by reference to specific examples. Several examples are depicted in drawings included with this application. An example is presented to illustrate, but not restrict, the invention.

DETAILED DESCRIPTION

A detailed description of the claimed invention is provided below by example, with reference to examples in the appended figures. Those of skill in the art will recognize that the components and steps of the invention as described by example in the figures below may be arranged and designed in a wide variety of different configurations without departing from the substance of the claimed invention. Thus, the detailed description of the examples in the figures is merely representative examples of the invention, and is not intended to limit the scope of the invention as claimed. Unless explicitly stated otherwise, references to animals or plants include "live or dead organisms"; thus, an animals or plants apparatus and a flora or fauna apparatus are both contemplated by this disclosure.

A purpose of the claimed methods is to facilitate the delivery of animals or plants to an animals or plants recipient. In one example, the animals or plants recipient may be a retail consumer having an animals or plants delivered to the recipient's dwelling. In a different example, a business may have a number of animals or plants delivered. Animals or plants may be delivered in bags or other containers.

The animals or plants retrieval system may use wireless networking protocols. The wireless networking protocols may include any protocol used with Internet of Things ("IoT") including but not limited to Bluetooth, ZigBee, Ethernet, WirelessHART, DigiMesh, ISA100.11a, IEEE 802.15.4, NFC, ANT, Eddystone, EnOcean, Wi-Fi, and WiMAX. The wireless communication protocol allows the animals or plants retrieval apparatus to communicate with a computing device associated with the person receiving the animals or plants or with a central server that communicates a combination of the animals or plants recipient, the animals or plants delivery service, and the animals or plants provider.

The method for operating an animals or plants retrieval apparatus may be implemented by an apparatus that maintains a two-way connection between the animals or plants retrieval apparatus and a control server. In one example an animals or plants retrieval system communicates with a control server to receive information about a batch of animals or plants to be retrieved, uses that information to confirm the receipt of the correct batch of animals or plants, and transmits information to a control server information about the batch of animals or plants retrieved and the animals or plants retrieval apparatus.

As used in the present specification and in the appended, the term transportation means moving an article from one location to another. Transportation may involve any means of propulsion, such as rolling, crawling, or flying, or using any means of force to provide that transportation. Such force may include mechanical force, air currents, or electromagnetic currents.

As used in the present specification and in the appended, the term location means a particular place or position. A number of sensors may be used to determine a location, such as a global positioning system.

As used in the present specification and in the appended, the term sensor refers to a device that detects or measures a physical property and records, indicates, or otherwise responds to the detection or measurement.

As used in the present specification and in the appended, the term communication refers to the imparting or exchange of information.

As used in the present specification and in the appended, the term radio frequency identification or RFID refers to a device that self identifies using radio frequencies. Identification may involve an active transmission of information. Identification may occur by a device that resonates based on an input frequency and the resonation causes an output frequency which can be used to identify the RFID device. An RFID device may be affixed to an apparatus or parcel to identify the apparatus or parcel.

As used in the present specification and in the appended, the term camera refers to a device capable of storing an image, or a series of images, in view of the sensor of a device. A camera may create a digital image or series of images. A camera creating a series of images may store or communicate the series of images using a video format.

As used in the present specification and in the appended, the term scale refers to an instrument that identifies the mass of an item, either directly as mass or as a measurement of that mass as the mass is subjected to gravitational force.

As used in the present specification and in the appended, the term temperature regulator refers to a device that identifies and controls the temperature of an area. A temperature regulator may identify the temperature using a thermometer, a thermocouple, a thermistor, a resistance temperature detector, or any other means of temperature measurement. A temperature regulator may control the temperature of an area by increasing or decreasing the temperature, by large or very small increments to keep the temperature in a specified range. The temperature may be increased or decreased using a heat pump.

As used in the present specification and in the appended claims, the term humidity controller refers to a device that identifies and controls the humidity of an area.

As used in the present specification and in the appended claims, the term "module" includes as processor communicatively coupled to a non-transitory storage medium which may contain data storage, and the data storage may have instructions that may be for a processor.

Figure 1:
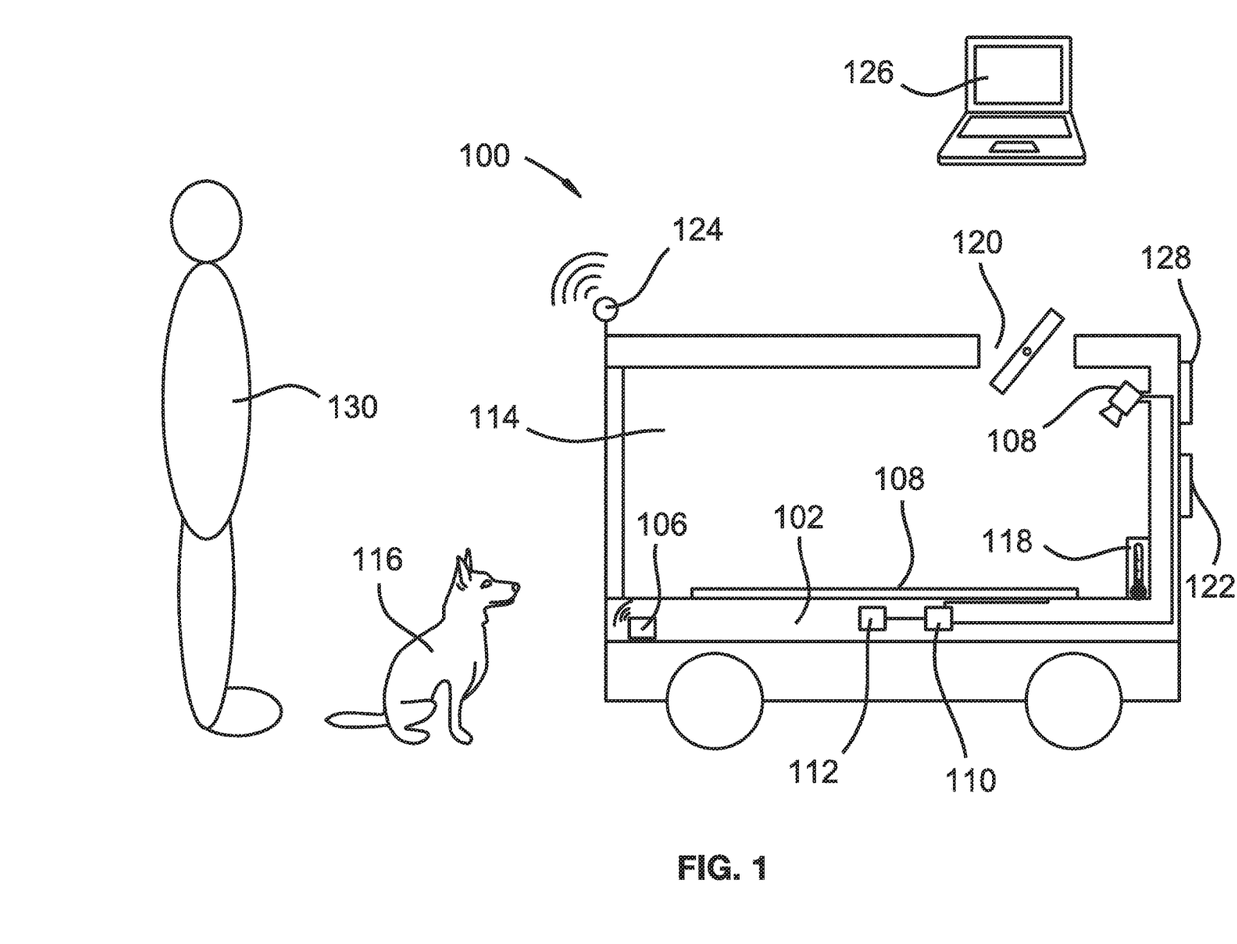
FIG. 1 illustrates an apparatus for retrieving animals or plants.

FIG. 1 shows a flora or fauna retrieval apparatus (100) for retrieving a number of animals or plants (116). A live organism may be a bacteria, fungus, plant or an animal, and in the preferred the embodiments the term flora or fauna refers to plants or animals and may include plants and animals and other living organisms. The flora or fauna retrieval apparatus (100) may comprise a frame (102) which may be rectangular. The frame (102) may be mechanically or communicatively connected to a transportation module (104), which may be moving the flora or fauna retrieval apparatus (100) between locations. In some embodiments, the flora or fauna retrieval apparatus (100) may include a movement system (1030). In some embodiments, the transportation module (104) may have a range of at least .5 feet or at least 1.5 feet and less than 2 miles. The transportation module (104) may cause the flora or fauna retrieval apparatus (100) to move using any method; for example, rolling flying, or crawling. In some preferred embodiments, the transportation module (104) may include at least one wheel (1034), engine or motor (1031), a power source, and a motor, and may move the flora or fauna retrieval apparatus (100) between a garage and a driveway in a home.

The power source may represent a source of energy that may be used for powering an engine or motor.

The flora or fauna retrieval apparatus (100) may also comprise a location identification module. The location identification module (106) may be mechanically connected to the frame (102) (102). The location module may identify the location of the flora or fauna retrieval apparatus (100) and may be a Global Positioning System. The location identification module (106) may use triangulation using a number of local positioning transmitters to identify its position with respect to the transmitters. The flora or fauna retrieval apparatus (100) may comprise a number of flora or fauna attribute sensors (108), which may measure attributes of a number of animals or plants (116) that have been delivered to the flora or fauna retrieval apparatus (100). The flora or fauna attribute sensors (108) may be mechanically connected to the frame (102).

The flora or fauna retrieval apparatus (100) may comprise a communication module (110). The communication module (110) may be communicatively connected to the number of flora or fauna attribute sensors (108). The communication module (110) may be configured to communicate with a computing device (202) to exchange information about the animals or plants to be retrieved, and obtain information about the optimal conditions for animals or plants scheduled to be delivered to the flora or fauna storage container (114). Information about optimal conditions for animals or plants scheduled to be delivered may include target temperature ranges, target oxygen levels, and target humidity level. This exchange of information may allow the flora or fauna retrieval apparatus (100) to verify that the correct animals or plants (116) have been delivered. The exchanged information may also allow the flora or fauna retrieval apparatus (100) to store the received animals or plants (116) at optimal conditions. Communication module (110) may instruct an enclosure barrier actuating mechanisms, such as a front door opener or a garage door opener, to open and close at various times or after various notifications have been received, such as a notification that a delivery agent is nearing the location of the flora or fauna retrieval apparatus (100). Communication module (110) may also provide a password to an enclosure barrier actuating mechanism.

The flora or fauna retrieval apparatus (100) may comprise a flora or fauna storage container (114). The flora or fauna storage container (114) may be mechanically connected to the frame (102), and may be configured to contain a received number of animals or plants (116). The flora or fauna storage container (114) may comprise a temperature regulator (118), an adjustable aperture device (120) to allow an inflow of air, and a humidity controller (122). The temperature regulator (118) may use the information about optimal conditions for animals or plants scheduled to be delivered, to adjust the temperature of the flora or fauna storage container (114) to remain within a target temperature range. The adjustable aperture device aperture (120) may be adjustable, and may use the information about optimal conditions for animals or plants scheduled to be delivered. The adjustable aperture device may rotate a barrier or trapdoor along a rod; the barrier or trapdoor when rotated may cause the aperture to be opened. Using information from an oxygen sensor positioned inside the container, a module may control the opening and closing of the barrier or trapdoor of the adjustable aperture device so as to control the size of the aperture, which may indirectly control the air flow into the container so that the oxygen level is brought closer to the desired levels for a flora or fauna which has been delivered to the flora or fauna storage container (114). Some methods include using an air management assembly comprising an intake aperture device defining an adjustable aperture allowing an in-flowing volume of air, an exhaust aperture device defining a second adjustable aperture allowing an outflowing volume of air, a fan assembly communicatively coupled to the aperture device, the fan assembly comprising a fan, a housing, a power supply, and communication wires connecting some elements of the air management assembly to an air management module which instructs the fan assembly to operate so as to cause an inflow or outflow of air to match optimal conditions stored in a non-transitory storage medium communicatively connected to the fan assembly.

The humidity controller (122) may use the information about optimal conditions for animals or plants scheduled to be delivered, to adjust the humidity of the flora or fauna storage container (114) to remain within a target humidity range.

The flora or fauna retrieval apparatus (100) may also comprise a radio frequency broadcast identification system (124). The radio frequency broadcast identification system (124) may identify the flora or fauna retrieval apparatus (100) to external systems (126). In some embodiments, the flora or fauna retrieval apparatus (100) may use the radio frequency identification system to open or close a barrier to an apartment building in which it was stored. The flora or fauna retrieval apparatus (100) may also comprise a number of user identifiers (128). The number of user identifiers (128) may identify a party (130) from whom the animals or plants (116) are being retrieved. The user identifiers (128) may be a biometric reader, a facial recognition module, a keypad, or an identification reader. In some embodiments, the number of user identifiers (128) may be a keypad, and the party (130) may enter a given personal identification number to gain access to the flora or fauna retrieval apparatus (100).

Additional disclosures about various subsystems of the apparatus which may be used for locomotion or sensing of the environment follow.

The flora or fauna retrieval apparatus (100) may include various subsystems such as a computer system (200), a movement system (1030), a sensor system (1020), a control system including modules for controlling a steering unit, one or more peripherals, as well as a power supply. The flora or fauna retrieval apparatus (100) may include more or fewer subsystems and each subsystem may include multiple elements. Further, each of the subsystems and elements of flora or fauna retrieval apparatus (100) may be interconnected. Thus, one or more of the described functions of the flora or fauna retrieval apparatus (100) may be divided up into additional functional or physical components, or combined into fewer functional or physical components. In some further examples, additional functional and/or physical components may be added to the examples illustrated by FIG. 2.

The sensor system (1020) may include a number of sensors configured to sense information about the environment of the autonomous neighborhood vehicle. For example, the sensor system (1020) may include a Global Positioning System (GPS), an accelerometer sensor, an inertial measurement unit (IMU), a gyroscopic sensor, a RADAR unit, a wheel encoding sensor, a laser rangefinder/LIDAR unit, a compass sensor, a camera (302), a stereo optical sensor, and/or an ultrasound unit. The sensor system (1020) may also include sensors configured to monitor flora or fauna residing within the main compartment of the flora or fauna retrieval apparatus (100) Other sensors are possible as well. One or more of the sensors included in sensor system (1020) may be configured to be actuated separately and/or collectively in order to modify a position and/or an orientation of the one or more sensors.

In one example, the wireless communication system may be configured to wirelessly communicate with one or more devices directly or via a communication network. For example, wireless communication system may use 3G cellular communication, such as CDMA, EVDO, GSM/GPRS, or 4G cellular communication, such as WiMAX or LTE. Alternatively, wireless communication system may communicate with a wireless local area network (WLAN), for example, using WiFi. In some embodiments, wireless communication system may communicate directly with a device, for example, using an infrared link, Bluetooth, or ZigBee. The wireless communication system may also enable the flora or fauna retrieval apparatus (100) to communicate and/or coordinate with an automated apparatus adapted to deliver the flora or fauna or a device being used by a human delivery agent.

The power supply may provide power to various components of flora or fauna retrieval apparatus (100) and may represent, for example, a rechargeable lithium-ion, lithium-sulfur, or lead-acid battery. In some embodiments, one or more banks of such batteries may he configured to provide electrical power. Other power supply materials and configurations are possible. In some embodiments, the power supply and energy source may be implemented together, as in some all-electric cars.

Many or all of the functions of flora or fauna retrieval apparatus (100) (e.g., the flora or fauna retrieval apparatus (100)) may be controlled by computer system (200). Computer system (200) may include at least one processor (370) (which may include at least one microprocessor) that executes instructions (206) stored in a non-transitory computer readable medium, such as the data storage (204). The processor (370) may be communicatively coupled to a server through a wireless network. The computing device 202 may be communicatively coupled to a plurality of computing devices, forming a computer system, that may serve to control individual components or subsystems of the flora or fauna retrieval apparatus (100) in a distributed fashion.

In some embodiments, data storage 204 may contain instructions 206 (e.g., program logic) executable by the processor (370) to execute various functions of flora or fauna retrieval apparatus (100), including those described above in connection with FIG. 2. Data storage 204 may contain additional instructions as well, including instructions to transmit data to, receive data from, interact with, and/or control one or more of the propulsion system 208, the sensor system (1020), the control system 230, and the Peripherals 248. In addition to the instructions 206, the data storage 204 may store data such as roadway maps, path information, among other information. Such information may be used by the flora or fauna retrieval apparatus (100) and computer system 200 at during the operation of the flora or fauna retrieval apparatus (100) in the autonomous modes. The flora or fauna retrieval apparatus (100) may include a user interface 104 for providing information to or receiving input from a user of the flora or fauna retrieval apparatus (100). The user interface may control or enable control of content and/or the layout of interactive images that may be displayed on the touchscreen. Further, the user interface (104) may include one or more input/output devices within the set of peripherals, such as the wireless communication system, the touchscreen, the microphone, and the speaker.

The computer system 200 may control the function of the flora or fauna retrieval apparatus 100) based on inputs received from various subsystems (e.g., movement system, sensor system (1020)) as well as from the user interface. For example, the computer system 200 may utilize input from movement system and sensors in order to control the steering unit to avoid an obstacle detected by the sensor system (1020) and the obstacle avoidance system 244. Depending upon the embodiment, the computer system 200 may be operable to provide control over many aspects of the flora or fauna retrieval apparatus (100) and its subsystems. The components of flora or fauna retrieval apparatus (100) may be configured to work in an interconnected fashion with other components within or outside their respective systems. For instance, in an example embodiment, the camera (302) may capture a plurality of images that may represent information about a state of an environment of a flora or fauna retrieval apparatus (100). Computer system may be used to provide computer vision for the flora or fauna retrieval apparatus (100).

FIG. 2 illustrates the computing device (202) in FIG. 1. The computing system (202) may include a computing device (200) such as a server with processor resources communicatively coupled to a non-transitory storage medium; data may be stored on the the non-transitory storage medium, which may also be referred to as data storage. The data may include the instructions of some of the modules it may have a power source; it may be communicatively connected to a radio frequency broadcast identification system (124); it may also be communicatively coupled to user identifiers (128). The computing device (202) shown in FIG. 2 may be coupled mechanically attached to a flora or fauna retrieval apparatus (100). The computing device (202) provides computational resources for the flora or fauna retrieval apparatus (100). In this example, the computing device (201) includes a processor (370), a non-transitory storage device (371), a power source (372) and a wireless transmitter (373). The processor (370) may cause the computing device (202) to perform a particular task. The processor (370) may instruct the transportation module (FIG. 2, 220) to move the flora or fauna retrieval apparatus (100); the processor (370) may receive feedback from the flora or fauna retrieval apparatus (100) (FIG. 1, 100). The processor (370) may operate a number of sensors (108), including a camera (FIG. 1, 130) or a scale (FIG. 2, 231). The processor may assist a location module (FIG. 2, 201) in identifying the location of the flora or fauna retrieval apparatus (100) (FIG. 1, 100).

The processor (370) may read a number of instructions from the non-transitory storage device (371). The non-transitory storage device (371) may include data used in the operation of the flora or fauna retrieval apparatus (100) (FIG. 1, 100). As illustrated, the non-transitory storage device (371) includes data on maps (374), input data (375), and recorded data (376). The maps (374) are used with the location module to calculate a travel path for the parcel retrieval system. The input data (375) may include input from a number of sensors related to the parcel or to the location of the flora or fauna retrieval apparatus (100) (FIG. 1, 100). The recorded data (376) may include both raw data from the number of sensors (108) and processed data recording the activity of the flora or fauna retrieval apparatus (100) (FIG. 1, 100) including information on a number of animals or plants received.

The computing device (202) may include a power source (372). The power source (372) provides electrical energy to the computing device (202). The power source (372) may be shared with the transportation module (FIG. 2, 220) to provide electrical energy to transport the flora or fauna retrieval apparatus (100) (FIG. 1, 100).

The computing device (202) may include a wireless transmitter (373). The wireless transmitter (373) may allow the computing device (202) to communicate with a server to gain information for the operation of the flora or fauna retrieval apparatus (100) (FIG. 1, 100). The wireless transmitter (373) may allow the computing device (202) to communicate with a server to give information about the operation of the flora or fauna retrieval apparatus (100) (FIG. 1, 100).

Figure 3A:
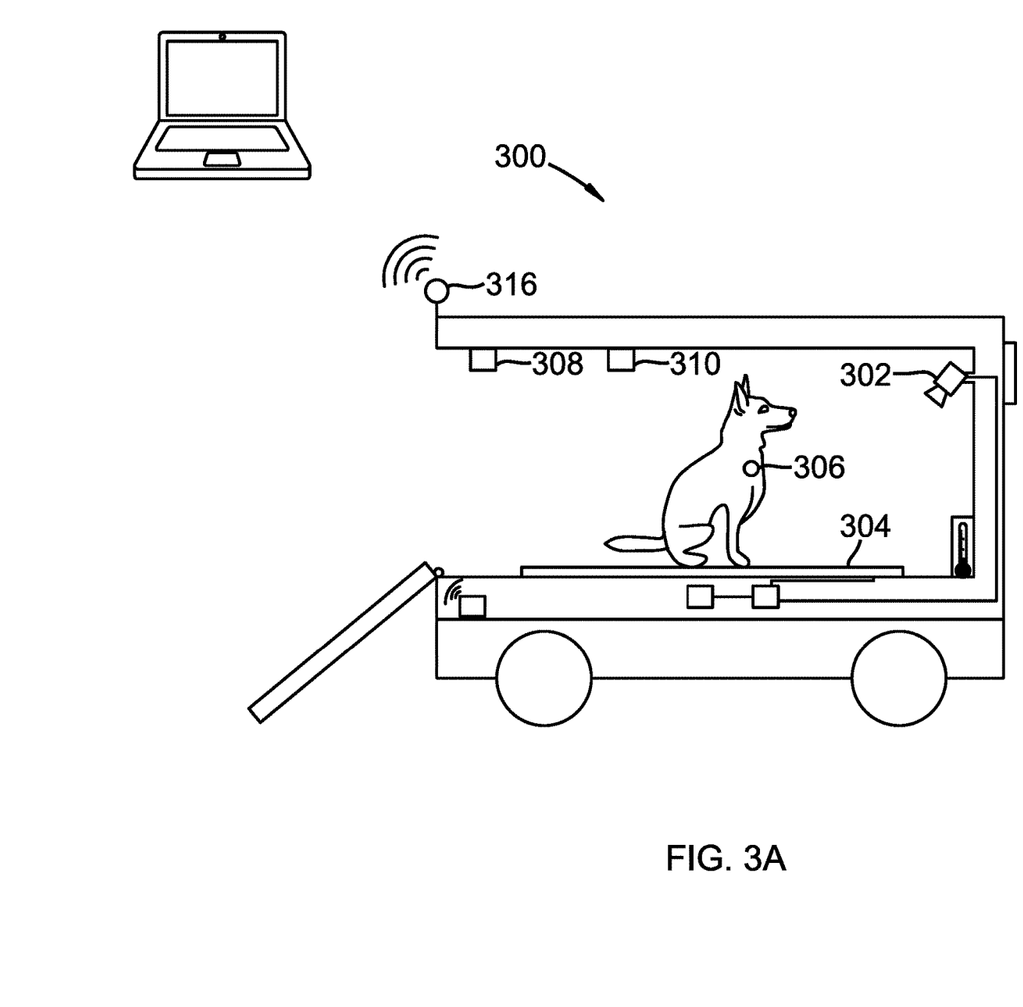
FIG. 3A illustrates flora or fauna attribute sensors on a flora or fauna retrieval apparatus, where the flora or fauna is at least one animal or at least one plant.

FIG. 3A shows some possible types of flora or fauna attribute sensors (108) in the flora or fauna retrieval apparatus (100) that may be applicable to animals or plants which are animals. The flora or fauna retrieval apparatus (100) may comprise any number and combination of flora or fauna attribute sensors (108).

In some embodiments, the flora or fauna attribute sensor may be a camera (302). The camera (302) may enable optical recognition of the delivered animals using an optical recognition module (1000).

In some embodiments, the flora or fauna attribute sensor may be a scale (304). The scale (304) may enable the flora or fauna retrieval apparatus (100) to examine the density and weight of the received number of animals. Examining the density and weight of the received animals may enable the flora or fauna retrieval apparatus (100) to verify that the correct animals have been delivered, and may enable the flora or fauna retrieval apparatus (100) to monitor the health of the received animals.

The flora or fauna attribute sensor may be a heartbeat monitor (306). The heartbeat monitor (306) may allow the flora or fauna retrieval apparatus (100) to monitor the health of the received number of animals.

The flora or fauna attribute sensor may be an oxygen sensor (308). The oxygen sensor (308) may monitor the oxygen content of the air in the flora or fauna storage container (114). The oxygen sensor (308) may communicate with the adjustable aperture (120), via the communication module (110), to adjust the oxygen content of the air in the flora or fauna storage container (114) to remain within the target ranges for oxygen content, according to the information about optimal conditions for animals or plants scheduled to be delivered.

The flora or fauna attribute sensor may be a motion sensor (310). The motion sensor (310) may enable the flora or fauna retrieval apparatus (100) to monitor the health of delivered animals.

The flora or fauna attribute sensor may be a humidity sensor (312). The humidity sensor (312) may communicate, via the communication module (110), with the humidity controller (122) to adjust the humidity of the flora or fauna storage container (114) to remain within the target humidity ranges, according to the information about optimal conditions for animals or plants scheduled to be delivered. The range for optimal oxygen levels for plants may be between 14% and 36% of the air in an environment. The range for optimal oxygen levels for animals may be between 14% and 36% of the air in an environment.

The flora or fauna attribute sensor may be a radio frequency identification reader (316).

Figure 3B:
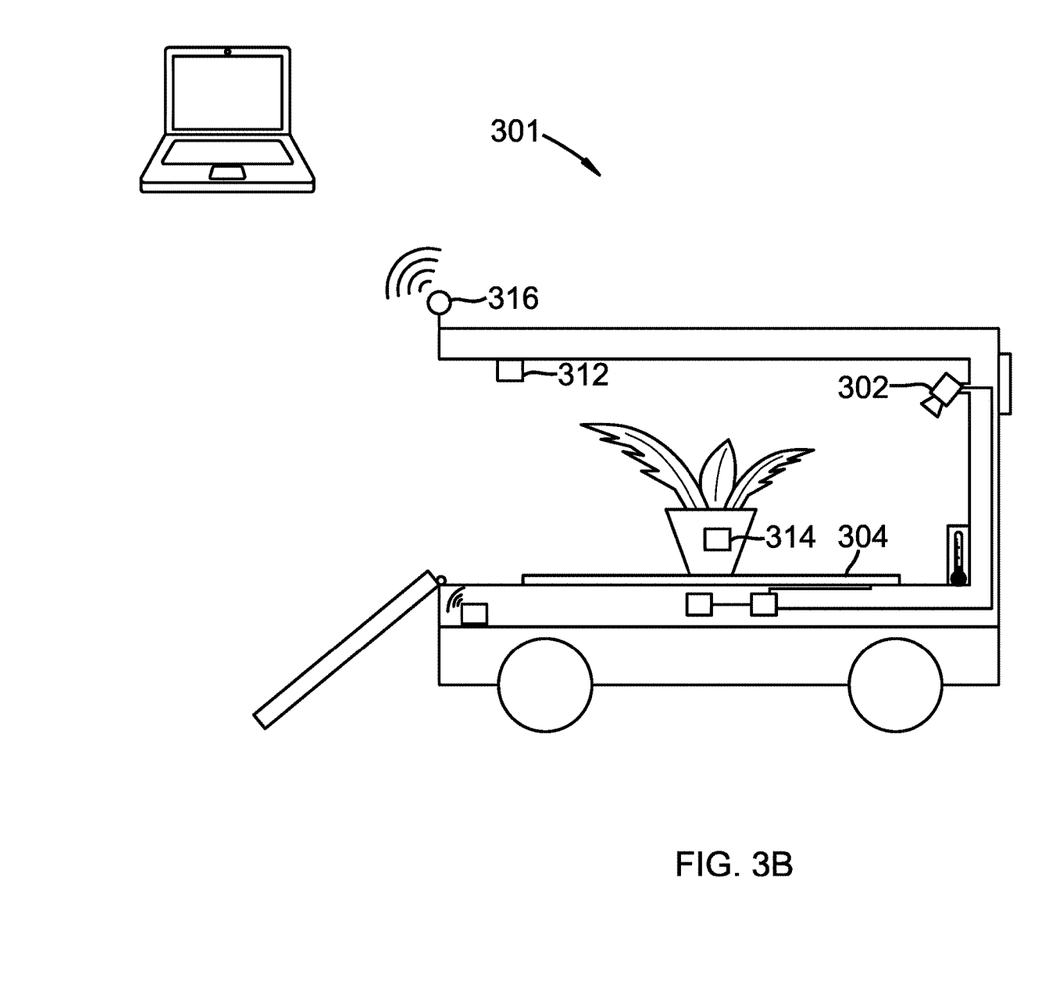
FIG. 3B illustrates flora or fauna attribute sensors on a flora or fauna retrieval apparatus, wherein the animals or plants are plants.

FIG. 3B shows some possible types of flora or fauna attribute sensors (108) in the flora or fauna retrieval apparatus (100) that may be applicable to animals or plants which are plants. The flora or fauna retrieval apparatus (100) may comprise any number and combination of flora or fauna attribute sensors (108). In some embodiments, the flora or fauna attribute sensor may be a camera (302). The camera (302) may enable optical recognition of the delivered plants using an optical recognition module (1000). In some embodiments, the flora or fauna attribute sensor may be a scale (304). The scale (304) may enable the flora or fauna retrieval apparatus (100) to examine the density and weight of the received number of plants. Examining the density and weight of the received plants may enable the flora or fauna retrieval apparatus (100) to verify that the correct plants have been delivered. The flora or fauna attribute sensor may be a humidity sensor (312). The humidity sensor (312) may communicate, via the communication module (110), with the humidity controller (122) to adjust the humidity of the flora or fauna storage container (114) to remain within the target humidity ranges, according to the information about optimal conditions for animals or plants scheduled to be delivered. The flora or fauna attribute sensor may be a soil moisture sensor (314). The soil moisture sensor (314) may monitor the soil of delivered plants, and may enable the flora or fauna retrieval apparatus (100) to monitor the health of delivered plants. In some embodiments, the flora or fauna retrieval apparatus (100) may also comprise a water source. In these embodiments, the soil moisture sensor (314) may communicate, via the communication module (110), with the water source. The water source may then add water to the soil of delivered plants when needed, according to the information about optimal conditions for animals or plants scheduled to be delivered. The flora or fauna attribute sensor may be a radio frequency identification reader (316).

In some embodiments, the apparatus may use a sensor to determine the presence of excrement and then may use a removal module (1002) coupled to a robotic arm to open a door to an excrement holding compartment, transfer the excrement to an adjacent excrement holding compartment, and then close the door to the excrement holding compartment.

Figure 4A:
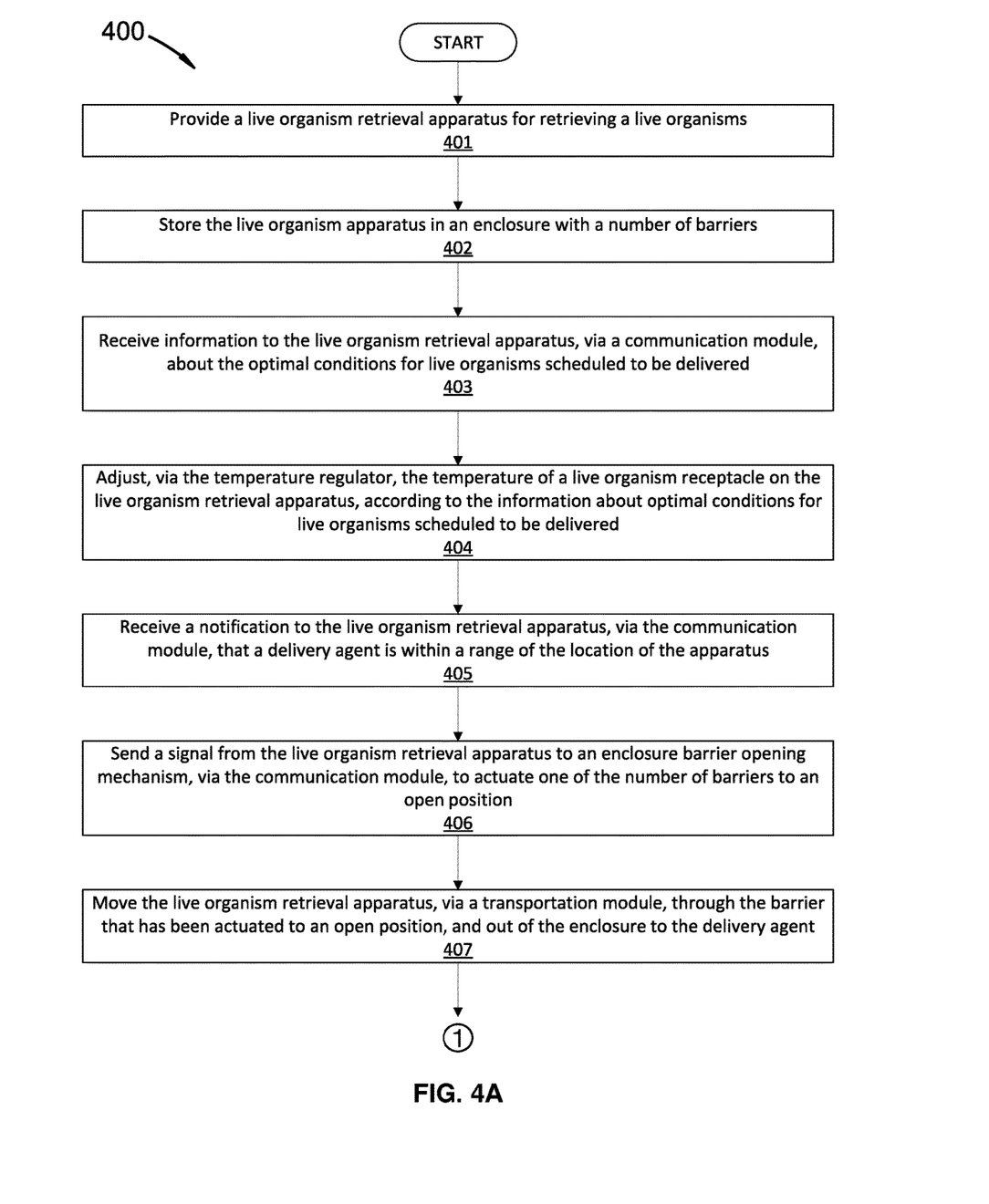
FIG. 4A and FIG. 4B illustrate a single method for receiving animals or plants using a flora or fauna retrieval apparatus which is depicted across two figures.

FIG. 4 is a diagram of a method (400) for receiving animals or plants using a flora or fauna retrieval apparatus (100). Step 401 is providing a flora or fauna retrieval apparatus (100). Step 402 is storing the flora or fauna retrieval apparatus (100) in an enclosure (502) with a number of barriers (504). In some preferred embodiments, the enclosure (502) may be a garage, and a barrier (504) may be a garage door. In some embodiments, an enclosure (502) may be a storage area, and a barrier (504) may be a door. Step 403 is receiving information, via a communication module (110), about optimal conditions for animals or plants scheduled to be delivered to the flora or fauna storage container (114). In step 404, the information about optimal conditions may be used to adjust the temperature of the flora or fauna storage container (114) via the temperature regulator (118). The temperature regulator (118) may adjust the temperature of the flora or fauna storage container (114) to be in the target temperature range. This step may also include adjusting the aperture (120) to let in an optimal amount of air, to maintain the oxygen content of the flora or fauna storage container (114) within the target oxygen content ranges, according to the information about optimal conditions. Step 404 may also include adjusting the humidity of the flora or fauna storage container (114), via the humidity controller (122), to remain within the target humidity ranges according to the information about optimal conditions.

Figure 4B:
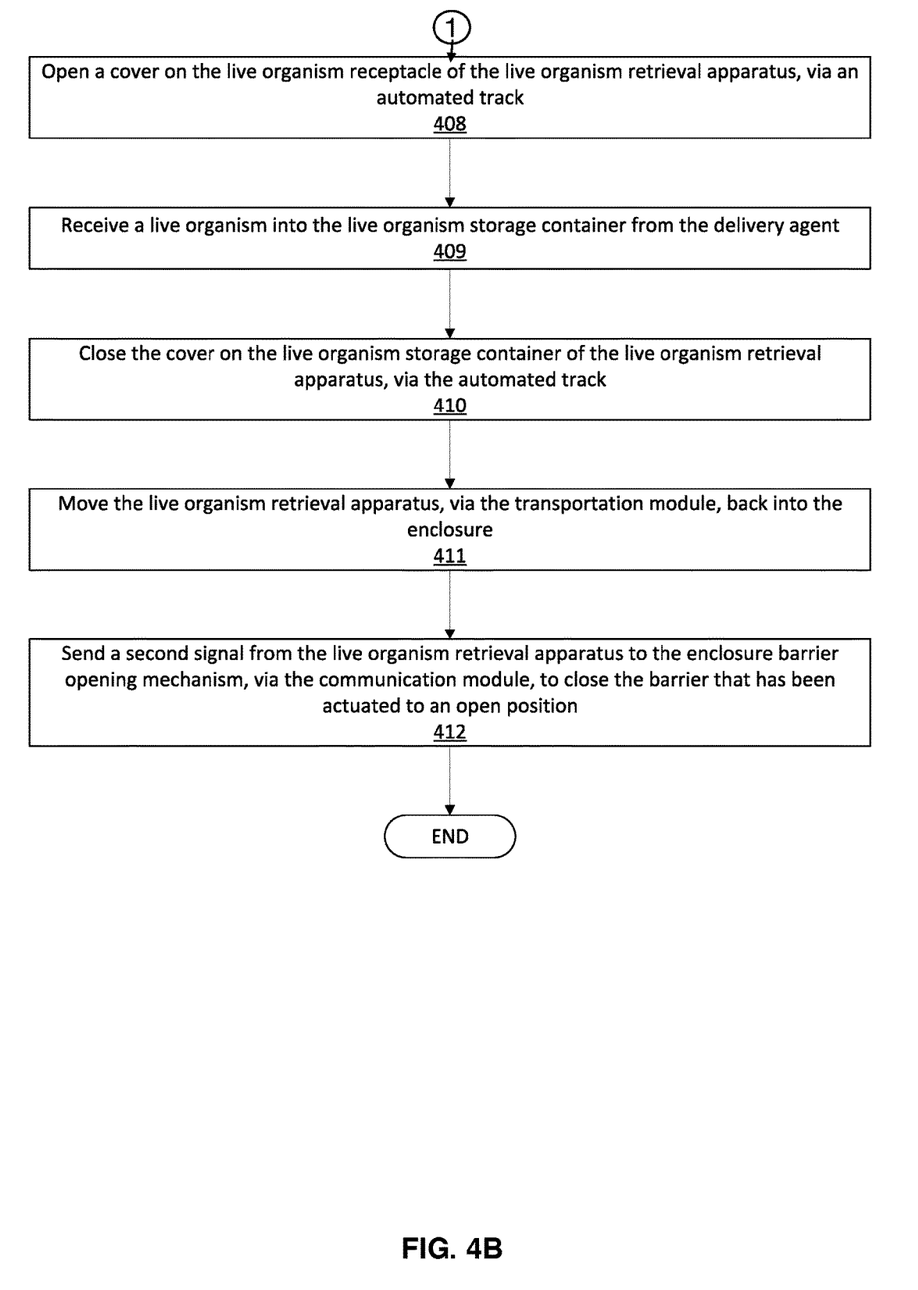

Step 405 is receiving a notification via the communication module (110) that a delivery agent (506) is nearby. In some embodiments, the range at which the communication module (110) receives a notification may be 3 miles. Step 406 is sending a signal via the communication module (110) to an enclosure barrier opening mechanism (508) to actuate at least one of the number of barriers (504) to an open position. In some preferred embodiments where the enclosure (502) is a garage, the communication module (110) may send a signal to a garage door opener to open a garage door. In step 407, the flora or fauna retrieval apparatus (100) moves, via the transportation module (104), through the at least one barrier (504) that has been actuated to an open position and out of the enclosure (502). Referring to FIG. 4B, Step 408 is opening a cover (510) on the flora or fauna storage container (114) via an automated track. Step 409 is receiving a number of animals or plants (116) from the delivery agent (506) into the flora or fauna storage container (114). The delivery agent (506) may be a delivery person or a drone. Step 410 is closing, via the automated track, the cover (510) on the flora or fauna storage container (114). Step 411 is using the transportation module (104) to return to the enclosure (502) in which the flora or fauna retrieval apparatus (100) was stored. Step 412 is sending a second signal, via the communication module (110), to the enclosure barrier opening mechanism (508) to close the barriers (504) that may have been actuated to an open position. In some preferred embodiments where the enclosure (502) is a garage, the flora or fauna retrieval apparatus (100) may return to the garage, and send a signal to the garage door opener to close the garage.

Figure 5:
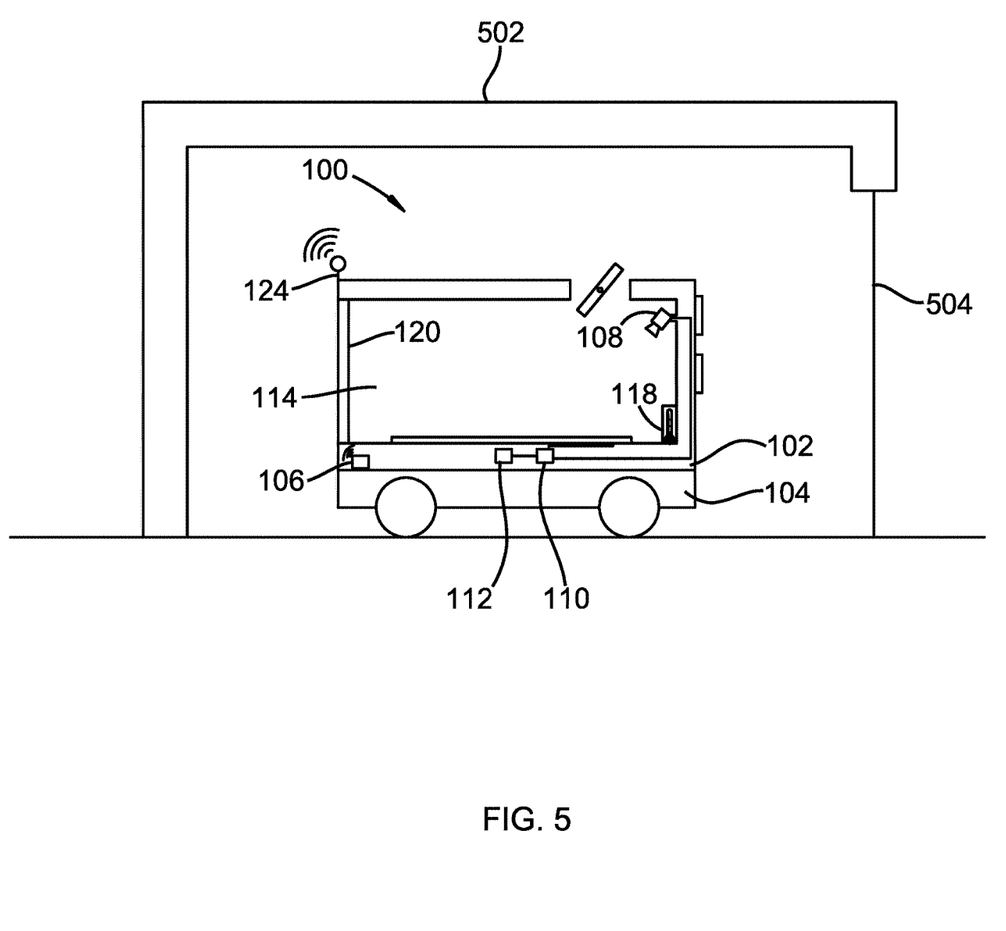
FIG. 5 illustrates a flora or fauna retrieving apparatus receiving a number of animals or plants.

FIG. 5 is an illustration of a method for retrieving animals or plants, as described in FIG. 5. The flora or fauna retrieval apparatus (100) may emerge from a garage (502), after receiving a notification that a delivery agent (506) is nearby and sending a signal to a garage door opener (508) to open the garage door (504). The flora or fauna retrieval apparatus (100) may then receive animals or plants (116) from the delivery agent (506), after opening the cover (510) on the flora or fauna storage container (114), into the flora or fauna storage container (114).

Figure 6:
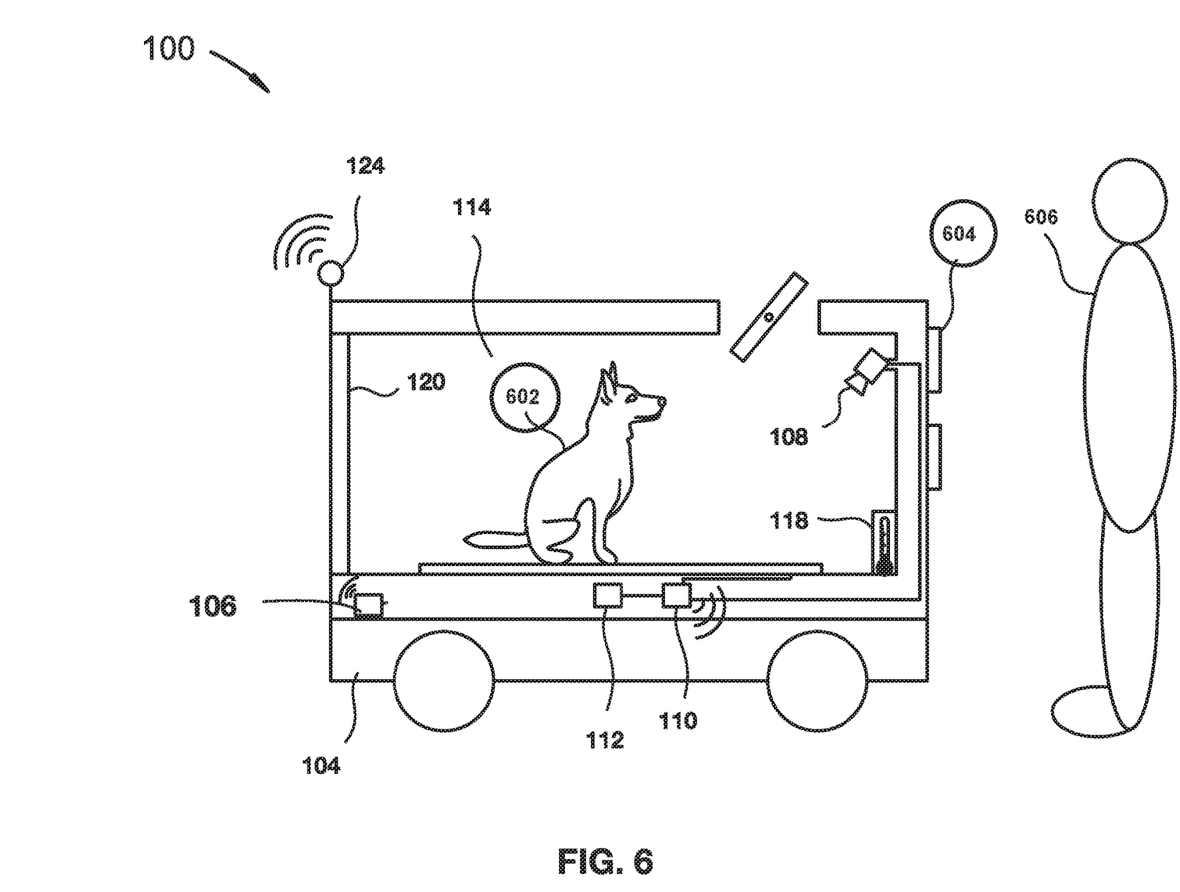
FIG. 6 illustrates an emergency notification system for a flora or fauna retrieval apparatus.

FIG. 6 is an illustration of a notification system for a flora or fauna retrieval apparatus (100). The flora or fauna retrieval apparatus (100) may include emergency contact data (1055), as shown in FIG. 2, which may be stored on a non-transitory medium. The flora or fauna retrieval apparatus (100) may monitor the health of the received number of animals or plants (116) via the flora or fauna attribute sensors (108), such as a camera. The flora or fauna retrieval apparatus (100) may send a notification to at least one emergency contact by accessing and using the emergency contact data (1055) when the flora or fauna attribute sensors (108) detect that the attributes of the received number of animals or plants (116) are outside the optimal ranges. In some embodiments, the flora or fauna retrieval apparatus (100) may send a temporary user identifier (604) to the emergency contact (606), an example is a four digit number which may be used as an access code for a track pin coupled to an enclosure barrier actuator such as a gearbox and chain system connected to a garage door and operable for opening and closing a garage door. The emergency contact (606) may then use the temporary user identifier to gain access to the flora or fauna storage container (114). For example, the flora or fauna may be an animal (602), and the emergency contact (606) may be a veterinarian. In this example, when the flora or fauna attribute sensors (108) detect that the animal (602) is unhealthy, the communication module (110) may send a temporary user identifier (604) which expires during a set period to the veterinarian, so that the veterinarian may retrieve the animal (602), and the animal (602) may then receive medical attention. The temporary user identifier (604) may be used to unlock a barrier such as a garage door and also may be used to unlock the flora or fauna storage container (114).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. A flora or fauna retrieval apparatus, the apparatus comprising:
   a processor;
   a sensor identifying the position of the flora or fauna retrieval apparatus;
   a number of flora or fauna attribute sensors coupled to a frame, the flora or fauna attribute sensors measuring an attribute of a number of animals or plants having a total volume less than 100 quarts and having been retrieved by the flora or fauna retrieval apparatus;
a movement system, communicatively coupled to the processor, comprising an engine or motor;
a movement system power source;
a transmission comprising at least one of a gearbox, clutch, different, and, at least one wheel,
a flora or fauna storage container mechanically connected to the frame to contain received animals or plants, the flora or fauna storage container comprising
a temperature regulator communicatively coupled to the processor;
an adjustable aperture device communicatively coupled to the processor and defining an aperture, the adjustable aperture device allowing an in-flow volume of air; and,
a humidity controller communicatively coupled to the processor;
wherein the frame is operably coupled to the at least one wheel
a non-transitory storage medium communicatively connected to the processor; the non-transitory storage medium comprising:
a transportation module communicatively-coupled to the movement system, the transportation module instructing the movement system to transport the flora or fauna retrieval apparatus between a first location and a second location;
a location identification module communicatively coupled to the sensor, the location identification module being coupled to the frame and identifying the location of the flora or fauna retrieval apparatus;
a communication module communicatively-coupled to the number of flora or fauna attributes sensors, the communication module comprising programmable code stored on the non-transitory storage medium wherein the programmable code comprises instructions for communicating an authentication token to an authentication module operating an enclosure barrier actuator;
communicating with an enclosure actuator module opening and closing an enclosure barrier actuator; and,
communicating with a computing device to a) receive information about when the animals or plants are to be retrieved and b) obtain information about the optimal conditions for animals or plants scheduled to be delivered to the flora or fauna storage container.

2. The flora or fauna retrieval apparatus of claim 1, the transportation module instructing the flora or fauna retrieval apparatus to roll, fly, or crawl at least 3 feet.

3. The flora or fauna retrieval apparatus of claim 1, further comprising a radio frequency broadcast identification system, the radio frequency broadcast identification system configured to identify the flora or fauna retrieval apparatus to external systems.

4. The flora or fauna retrieval apparatus of claim 1, further comprising a number of user identifiers, to identify a party from whom the animals or plants are being retrieved.

5. The flora or fauna retrieval apparatus of claim 4, wherein the number of user identifiers includes at least one of a biometric reader, a facial recognition module, and an identification reader.

6. The flora or fauna retrieval apparatus of claim 1, wherein the flora or fauna attribute sensors include at least one of a camera, a weight scale, a heartbeat monitor, an oxygen sensor, a motion sensor, a humidity sensor, a soil moisture sensor, and a radio frequency identification reader.

7. The flora or fauna retrieval apparatus of claim 1, the adjustable aperture device communicatively-coupled to the oxygen sensor; the adjustable aperture device adjusting the size of the aperture to allow an inflow of air resulting in an oxygen level within optimal condition ranges for animals or plants to be retrieved.

8. The flora or fauna retrieval apparatus of claim 1, additionally comprising emergency contact information.

9. The flora or fauna retrieval apparatus of claim 8, wherein the communication module notifies an emergency contact that the animals require immediate attention, when the flora or fauna attribute sensors detect that the attributes of the animals or plants are outside the allowed range according to the information about animals or plants scheduled to be delivered to the flora or fauna storage container.

10. The flora or fauna retrieval apparatus of claim 1, wherein the temperature regulator is configured to adjust the temperature of the flora or fauna receptacle according to the information about the optimal conditions for animals or plants scheduled to be delivered to the flora or fauna storage container.

11. The flora or fauna retrieval apparatus of claim 1, wherein the humidity controller is configured to adjust the humidity of the flora or fauna receptacle according to the information about the optimal conditions for animals or plants scheduled to be delivered to the flora or fauna storage container.

12. The flora or fauna retrieval apparatus of claim 1, wherein a flora or fauna attribute sensor is a camera.

13. The flora or fauna retrieval apparatus of claim 10, further comprising an optical live flora or fauna recognition module of the received number of animals or plants.

14. A method of retrieving animals or plants, comprising:
providing a flora or fauna retrieval apparatus for retrieving animals or plants, storing the flora or fauna retrieval apparatus in an enclosure with a number of barriers;
receiving information at the flora or fauna retrieval apparatus, via a communication module, about the optimal conditions for animals or plants scheduled to be delivered;
adjusting, via a temperature regulator, the temperature of a flora or fauna receptacle on the flora or fauna retrieval apparatus, according to the information about optimal conditions for animals or plants scheduled to be delivered;
receiving a notification at the flora or fauna retrieval apparatus, via the communication module, that a delivery agent is within a distance range of the location of the apparatus;
sending a signal from the flora or fauna retrieval apparatus to an enclosure barrier opening mechanism, via the communication module, to actuate one of the number of barriers to an open position;
moving the flora or fauna retrieval apparatus, via a transportation module, through the barrier that has been actuated to an open position, and out of the enclosure to the delivery agent;
opening a cover on the flora or fauna receptacle of the flora or fauna retrieval apparatus, via an automated track;
receiving a flora or fauna into the flora or fauna storage container from the delivery agent;
closing the cover on the flora or fauna storage container of the flora or fauna retrieval apparatus, via the automated track;
moving the flora or fauna retrieval apparatus, via the transportation module, back into the enclosure;

sending a second signal from the flora or fauna retrieval apparatus to the enclosure barrier opening mechanism, via the communication module, to close the barrier that has been actuated to an open position.

15. The method as in claim 14, wherein the distance range is 3 miles away or less.

16. The method as in claim 14, additionally comprising:
adjusting an adjustable aperture on the flora or fauna receptacle to let in air according to the information about optimal conditions for animals or plants scheduled to be delivered to the flora or fauna storage container.

17. The method as in claim 14, additionally comprising:
providing a number of flora or fauna attribute sensors mechanically connected to the flora or fauna receptacle and communicatively connected to the communication module; and,
measuring, via the flora or fauna attribute sensors, attributes of a number of animals or plants to be retrieved.

18. The method as in claim 16, additionally comprising:
obtaining, via the communication module, information about the animals or plants to be retrieved;
notifying, via the communication module, an emergency contact that the animals or plants require immediate attention, when the flora or fauna attribute sensors detect that the attributes of the animals or plants are outside the allowed range according to the information about the animals or plants scheduled to be retrieved; and,
providing, via the communication module, an enclosure access code to an emergency contact.

19. A flora or fauna retrieval apparatus, comprising:
a frame;
a transportation module mechanically connected to the frame, the transportation module moving the flora or fauna retrieval apparatus between locations;
a location identification module mechanically connected to the frame, the location identification module identifying the location of the flora or fauna retrieval apparatus;
a number of flora or fauna attribute sensors mechanically connected to the frame, the flora or fauna attribute sensors measuring attributes of a number of animals or plants to be retrieved;
a communication module communicatively connected to the number of flora or fauna attributes sensors, the communication module communicating with a computing device to a) exchange information about the animals or plants to be retrieved; b) obtain information about the optimal conditions for animals or plants scheduled to be delivered to the flora or fauna storage container,
a flora or fauna storage container mechanically connected to the frame to contain received animals or plants, the flora or fauna storage container comprising a temperature regulator, an adjustable aperture to let in air, and a humidity controller;
the adjustable aperture configured to adjust to let in air according to the information about optimal conditions for animals or plants to be retrieved;
the temperature regulator configured to adjust the temperature of the flora or fauna receptacle according to the information about the optimal conditions for animals or plants scheduled to be delivered to the flora or fauna storage container;
the humidity controller configured to adjust the humidity of the flora or fauna receptacle according to the information about the optimal conditions for animals or plants scheduled to be delivered to the flora or fauna storage container;
the communication module configured to notify an emergency contact that the animals or plants require immediate attention, if the flora or fauna attribute sensors detect that the attributes of the animals or plants are outside the allowed range according to the information about the animals or plants scheduled to be retrieved;
a radio frequency broadcast identification system, the radio frequency broadcast identification system identifying the flora or fauna retrieval apparatus to external systems; and
a number of user identifiers, to identify a party from whom the animals or plants are being retrieved.

20. The flora or fauna retrieval apparatus of claim 19, wherein:
the live organisms are animals weighing in total less than 350 pounds, and the communication module is configured to send a temporary user identifier to the emergency contact and allow the person with the temporary user identifier access to the flora or fauna storage container.

* * * * *